US011890691B2

(12) United States Patent
Okamoto et al.

(10) Patent No.: US 11,890,691 B2
(45) Date of Patent: Feb. 6, 2024

(54) WIRE ELECTRIC DISCHARGE MACHINING DEVICE, AND CONTROL METHOD AND CONTROL PROGRAM THEREFOR

(71) Applicant: MAKINO MILLING MACHINE CO., LTD., Tokyo (JP)

(72) Inventors: Yasuhiro Okamoto, Okayama (JP); Haruya Kurihara, Kanagawa (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 434 days.

(21) Appl. No.: 17/255,894

(22) PCT Filed: Jun. 19, 2019

(86) PCT No.: PCT/JP2019/024369
§ 371 (c)(1),
(2) Date: Dec. 23, 2020

(87) PCT Pub. No.: WO2020/004199
PCT Pub. Date: Jan. 2, 2020

(65) Prior Publication Data
US 2021/0260678 A1  Aug. 26, 2021

(30) Foreign Application Priority Data
Jun. 27, 2018 (JP) ................... 2018-122151

(51) Int. Cl.
*B23H 7/18* (2006.01)
*B23H 7/04* (2006.01)
*B23H 7/20* (2006.01)

(52) U.S. Cl.
CPC ............. *B23H 7/18* (2013.01); *B23H 7/04* (2013.01); *B23H 7/20* (2013.01)

(58) Field of Classification Search
CPC .. B23H 7/20; B23H 7/065; B23H 7/04; B23H 7/18; G05B 2219/45043
See application file for complete search history.

(56) References Cited

U.S. PATENT DOCUMENTS 3,875,362 A   4/1975  Balleys
4,983,800 A   1/1991  Taneda
(Continued)

FOREIGN PATENT DOCUMENTS

JP    S56-7806 B2   2/1981
JP    H4-57619 A    2/1992
(Continued)

OTHER PUBLICATIONS

Machine translation of Poland Patent document No. 222, 103-B1, Mar. 2023 (Year: 2023).*

(Continued)

*Primary Examiner* — Geoffrey S Evans
(74) *Attorney, Agent, or Firm* — Morrison & Foerster LLP

(57) ABSTRACT

The object of the present invention is to make it possible to maintain a stable electric discharge and to achieve a stable quality and machining performance even when a work having a non-uniform composition is machined. A wire electric discharge machining device performs electric discharge machining on a work while controlling an inter-electrode distance between a wire and the work based on an inter-electrode voltage between the wire and the work so as to match a set target voltage. The wire electric discharge machining device includes an inter-electrode voltage measuring unit that measures the inter-electrode voltage, an actual amplitude calculating unit that calculates an amplitude of the measured inter-electrode voltage, and a target voltage correcting unit that corrects the target voltage in (Continued)

such a way that the calculated amplitude approaches the target amplitude that is set to a value larger than zero.

7 Claims, 7 Drawing Sheets

(56) References Cited

U.S. PATENT DOCUMENTS

| | | | | |
|---|---|---|---|---|
| 5,453,592 | A | * 9/1995 | Takeuchi | B23H 7/20 219/69.12 |
| 5,874,703 | A | 2/1999 | Derighetti | |
| 2013/0092660 | A1 | * 4/2013 | Morita | B23H 1/024 219/69.11 |
| 2017/0014926 | A1 | 1/2017 | Kim | |
| 2019/0337069 | A1 | * 11/2019 | Ojha | B23H 7/14 |

FOREIGN PATENT DOCUMENTS

| | | |
|---|---|---|
| JP | 2853092 B2 | 2/1999 |
| JP | 2012-166289 A | 9/2012 |
| JP | 5372252 B | 12/2013 |
| JP | 5794401 B1 | 10/2015 |
| JP | 2016-124059 A | 7/2016 |
| PL | 222103 B1 * | 6/2016 |
| WO | 2015/145484 A1 | 10/2015 |
| WO | 2017/130272 A1 | 8/2017 |

OTHER PUBLICATIONS

International Search Report dated Jul. 16, 2019, directed to International Application No. PCT/JP2019/024369; 5 pages.

Extended European Search Report dated Mar. 3, 2022, directed to EP Application No. 19826984.7; 9 pages.

* cited by examiner

WIRE ELECTRIC DISCHARGE MACHINING DEVICE, AND CONTROL METHOD AND CONTROL PROGRAM THEREFOR

CROSS-REFERENCE TO RELATED APPLICATIONS

This application is a 35 USC 371 application of International Application No. PCT/JP2019/024369, filed Jun. 19, 2019, which claims the priority of Japanese Application No. 2018-122151, filed Jun. 27, 2018, the entire contents of each of which are incorporated herein by reference.

FIELD OF THE DISCLOSURE

The present invention relates to a wire electric discharge machining device, a control method and a control program therefor.

BACKGROUND

Conventionally, a wire saw has been known as a device for slicing a silicon ingot into a multitude of thin pieces. As a technique for replacing a conventional wire saw, a wire electric discharge machining device has been known that generates a discharge electric current between a wire and a work to cut the work by applying a voltage between the wire and the work which are in a state of being immersed in machining fluid. In order to maintain a stable machining performance in the wire electric discharge machining device, it is important to adjust an inter-electrode space between the wire and the work.

Patent Literature 1 (Japanese Patent No. 5372252) discloses a technique of optimizing a proportional gain for a servo mechanism in order to maintain a minute space between a wire and a work at an optimum distance. Specifically, Patent Literature 1 discloses a technique of indirectly optimizing a proportional gain for a servo mechanism by detecting an amplitude of a measured value of an inter-electrode voltage in a feedback system of the inter-electrode voltage between a wire and a work; multiplying the measured value of the inter-electrode voltage by a coefficient corresponding to the amplitude so as to calculate an evaluation voltage; and then multiplying a difference between an inter-electrode setting voltage and the evaluation voltage by a proportional gain.

Patent Literature 2 (WO 2015/145484 A1) discloses a technique in which, in order to keep a side gap constant (the side gap being a distance between a machining electrode and a work, which is generated in the direction perpendicular to the direction in which the machining proceeds), an inter-electrode average voltage is corrected according to a machining speed and a difference between the corrected inter-electrode average voltage and a setting voltage that is a target value of the inter-electrode voltage, so as to control the machining speed based on the difference.

SUMMARY

In the conventional wire electric discharge machining device, a target inter-electrode voltage that is a target value of the inter-electrode voltage is set in accordance with a desired machining shape, and a machining speed is controlled in such a way that the inter-electrode voltage matches the target inter-electrode voltage. Such feedback control is effective for a work having a stable composition, and makes it possible to maintain a stable quality.

However, when a work having a non-uniform composition is machined, ease of machining is varied. Therefore, if the conventional feedback control as described above is performed, the interval between the work and the wire may be controlled to be unnecessarily small. In this case, the work and the wire can be short-circuited, which may make it impossible to maintain a stable electric discharge and may result in a reduced yield and a quality deterioration.

The present invention has been made in view of such circumstances, and it is an object of the present invention to provide a wire electric discharge machining device, a control method and a control program therefor that can maintain a stable electric discharge and achieve a stable quality and machining performance even when a work having a non-uniform composition is machined.

According to a first aspect of the present invention, there is provided a wire electric discharge machining device that performs electric discharge machining on a work while controlling an inter-electrode distance between a wire and the work based on an inter-electrode voltage between the wire and the work so as to match a set target voltage. The wire electric discharge machining device includes an inter-electrode voltage measuring unit that measures the inter-electrode voltage, an actual amplitude calculating unit that calculates an amplitude of the measured inter-electrode voltage, and a target voltage correcting unit that corrects the target voltage in such a way that the calculated amplitude approaches a target amplitude that is set to a value larger than zero.

According to the wire electric discharge machining device described above, the inter-electrode voltage between the wire and the work is measured by the inter-electrode voltage measuring unit, and the amplitude of the measured inter-electrode voltage is calculated by the actual amplitude calculating unit. Then, the target voltage is corrected in such a way that the calculated amplitude approaches the target amplitude. In this regard, the target amplitude is set to a value larger than zero. This makes it possible to prevent the interval between the wire and the work from becoming narrower than necessary as compared with the case in which the target amplitude is set to zero. As a result, a short circuit between the wire and the work can be prevented, thereby making it possible to maintain a stable electric discharge. By setting the target amplitude to a value larger than zero, oscillation of the inter-electrode voltage can be allowed within the range of the target amplitude. As a result, should the wire and the work be short-circuited, the wire can be separated again from the work with physical oscillation of the wire resulting from oscillation of the inter-electrode voltage.

In the wire electric discharge machining device described above, the target voltage correcting unit may correct the target voltage in a direction to reduce the target voltage when the amplitude calculated by the actual amplitude calculating unit is larger than the target amplitude, and correct the target voltage in a direction to increase the target voltage when the amplitude calculated by the actual amplitude calculating unit is smaller than the target amplitude.

According to the wire electric discharge machining device described above, when the amplitude of the inter-electrode voltage is larger than the target amplitude, the target voltage is corrected in a direction of reducing the target voltage. As a result, the inter-electrode distance between the wire and the work is controlled to be smaller than that before correction. On the contrary, when the amplitude of the inter-electrode voltage is smaller than the target amplitude, the target voltage is corrected in a direction of increasing the target voltage. As a result, the inter-electrode distance between the wire and the work is controlled to be longer than that before correction. This makes it possible to keep the amplitude of the inter-electrode voltage within an appropriate range.

In the wire electric discharge machining device described above, the target voltage correcting unit may include a correction value calculating unit that calculates a target voltage correction value by using the amplitude of the inter-electrode voltage calculated by the actual amplitude calculating unit and the target amplitude, and a correcting unit that corrects the target voltage by using the target voltage correction value.

According to the wire electric discharge machining device described above, the target voltage correction value for causing the amplitude of the inter-electrode voltage to approach the target amplitude is calculated by using the amplitude of the inter-electrode voltage and the target amplitude, and the target voltage is corrected based on the calculated target voltage correction value. As a result, the amplitude of the inter-electrode voltage can be controlled within a range suitable for electric discharge machining, thereby making it possible to achieve a stable electric discharge machining.

In the wire electric discharge machining device described above, the target voltage correcting unit may include a correction value limiting unit that limits the target voltage correction value within a preset limit range, and the correcting unit may correct the target voltage by using the target voltage correction value that is limited by the correction value limiting unit.

According to the wire electric discharge machining device described above, since the correction value limiting unit is provided to limit the target voltage correction value within a preset limit range in advance, excessive correction of the target voltage can be prevented.

The wire electric discharge machining device described above may include a switching unit that switches whether or not the target voltage is corrected by the target voltage correcting unit on the basis of a composition of the work.

According to the wire electric discharge machining device described above, it is possible to select an appropriate control method corresponding to the composition of the work.

In the wire electric discharge machining device described above, the target voltage correcting unit may correct the target voltage when the work contains silicon carbide.

For example, when the work contains the silicon carbide, the composition is non-uniform inside the work as compared with that of a uniform work using Si as a material. Thus, there is a possibility that the amplitude of the inter-electrode voltage measured by the inter-electrode voltage measuring unit suddenly changes or the amplitude value increase. Therefore, when the work containing the silicon carbide as described above is machined, the target voltage is corrected based on the amplitude of the inter-electrode voltage to reduce fluctuation of the inter-electrode voltage, thereby making it possible to achieve a stable electric discharge machining.

According to a second aspect of the present invention, there is provided a control method for a wire electric discharge machining device that performs electric discharge machining on a work while controlling an inter-electrode distance between a wire and the work based on an inter-electrode voltage between the wire and the work so as to match a set target voltage. The control method includes an inter-electrode voltage measuring step of measuring the inter-electrode voltage, an actual amplitude calculating step of calculating an amplitude of the measured inter-electrode voltage, and a target voltage correcting step of correcting the target voltage in such a way that the calculated amplitude approaches a target amplitude that is set to a value larger than zero.

According to a third aspect of the present invention, there is provided a control program for a wire electric discharge machining device that is applied to the wire electric discharge machining device that performs electric discharge machining on a work while controlling an inter-electrode distance between a wire and the work based on an inter-electrode voltage between the wire and the work so as to match a set target voltage. The control program causes a computer to execute an actual amplitude calculating process of calculating an amplitude of a measured inter-electrode voltage, and a target voltage correcting process of correcting the target voltage in such a way that the calculated amplitude approaches a target amplitude that is set to a value larger than zero.

According to the present invention, an effect is obtained that a stable electric discharge can be maintained and a stable quality and machining performance can be achieved even when a work having a non-uniform composition is machined.

DETAILED DESCRIPTION

Hereinafter, a wire electric discharge machining device 1, and a control method and a control program therefor according to an embodiment of the present invention will be described with reference to the drawings. In the present embodiment, the upward direction and the downward direction correspond to the direction opposite to gravity and the direction of gravity, respectively. The left-right direction corresponds to the horizontal direction orthogonal to the direction of gravity.

Figure 1:
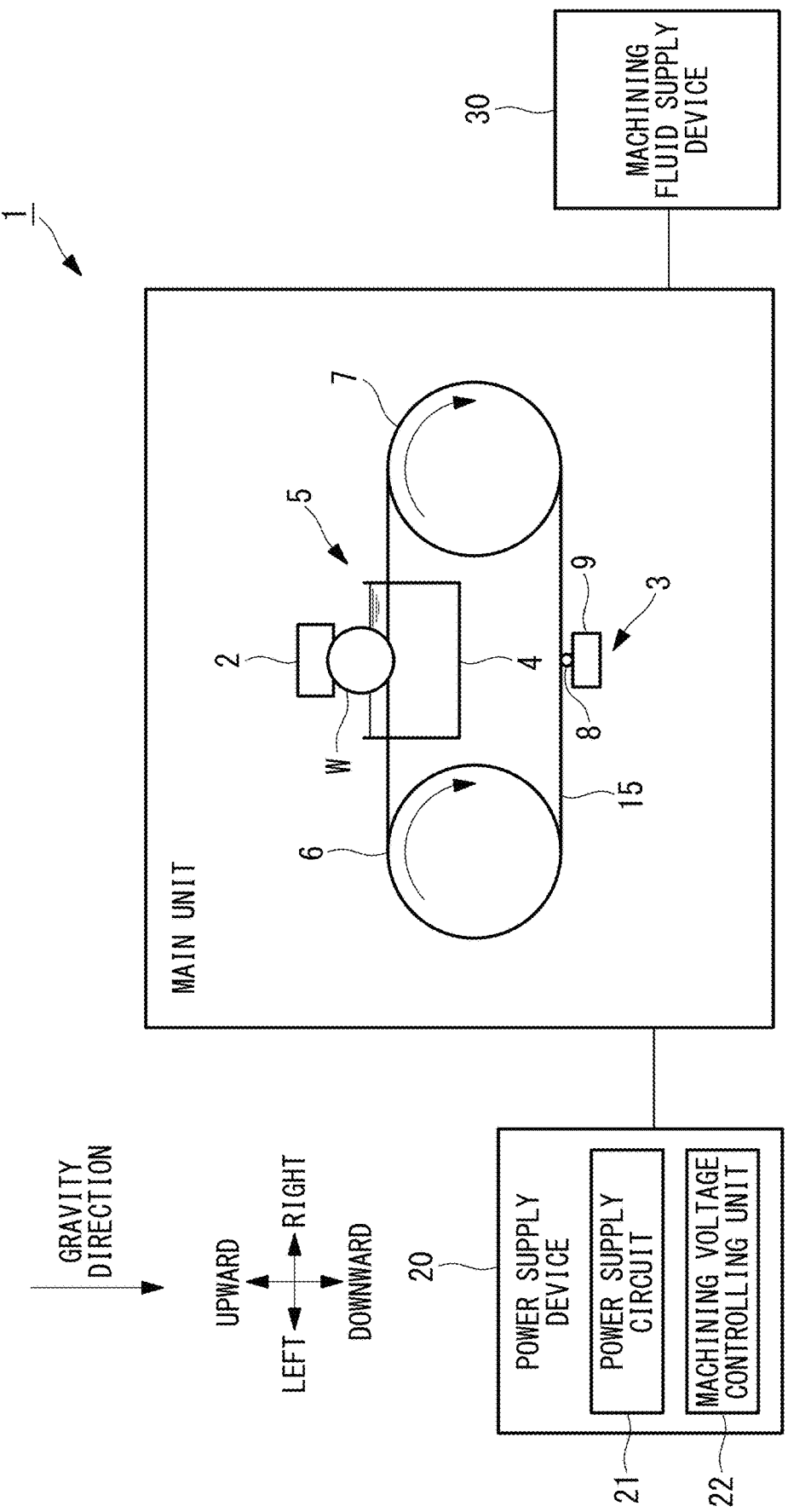
FIG. 1 is an overall configuration diagram of a wire electric discharge machining device according to an embodiment of the present invention.
Figure 2:
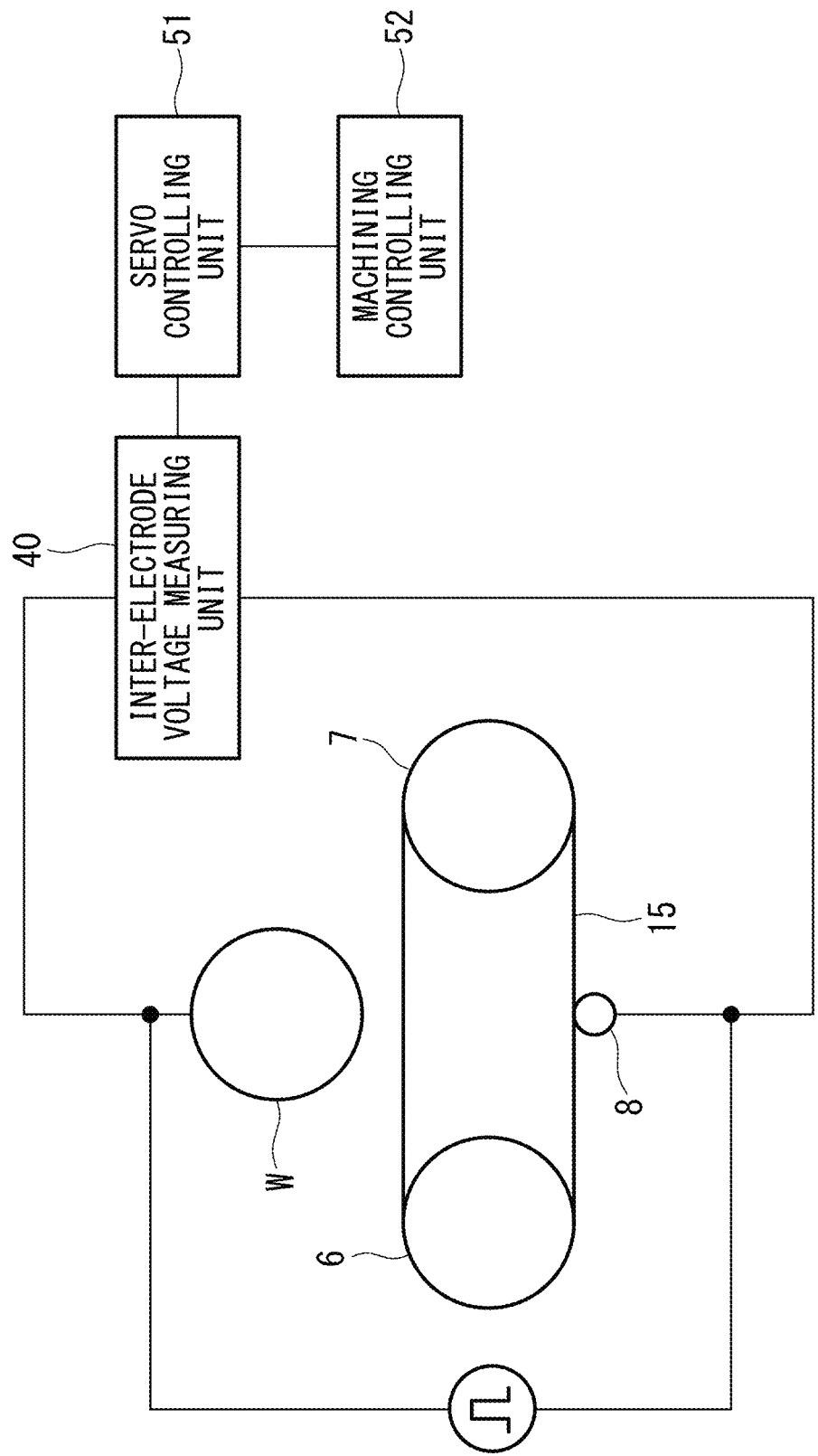
FIG. 2 is a schematic configuration diagram in which a configuration relating to a power supply system and a servo control system is mainly extracted and shown in the wire electric discharge machining device according to an embodiment of the present invention.

FIG. 1 is an overall configuration diagram of the wire electric discharge machining device 1 according to an embodiment of the present invention, and FIG. 2 is a schematic configuration diagram in which a configuration relating to a power supply system and a servo control system is mainly extracted and shown. The configurations of the respective mechanisms shown in FIGS. 1 and 2 are merely examples, and various aspects can be taken depending on a purpose and an application.

As shown in FIG. 1, the wire electric discharge machining device 1 according to the present embodiment is a device that generates an electric discharge current between a wire 15 and a work W by applying a pulse voltage between the wire 15 and the work W, and cuts (slices) the work W at a position of the wire 15.

The wire electric discharge machining device 1 is provided, for example, with a work feeding unit 2 that holds the work W and feeds the work W to a machining unit 5, the machining unit 5 that drives the wire 15 and cuts the work W fed by the work feeding unit 2 with an energy of an electric discharge current generated by an electric discharge phenomenon, and a power supplying unit 3 that applies a pulse voltage between the work W and the wire 15.

The work feeding unit 2 gradually advances cutting of the work W by the wire 15 while keeping an interval (gap) between the wire 15 and the work W at an appropriate distance, for example, due to control of rotational drive of a servomotor (not shown) by a servo controlling unit 51 (see FIG. 2) that will be described below.

The machining unit 5 includes a machining reservoir 4 that contains a machining fluid in which the wire 15 and the work W are immersed, a pair of main rollers consisting of a main roller 6 and a main roller 7 that drives the wire 15 which is in a state of being immersed in the machining fluid, and the wire 15 that is driven by the pair of main rollers.

The machining reservoir 4 is a container for storing the machining fluid necessary for electric discharge generated between the work W and the wire 15. As the machining fluid, it is preferable to use a fluid having a high resistance value. Therefore, pure water, electric discharge machining oil or the like is used, for example.

The main roller 6 and the main roller 7 are cylindrical structural bodies having the same outer diameters, and each have a structure in which the center axis made of metal is covered with resin. A plurality of grooves (for example, V-shaped grooves) extending along a traveling direction of the wire 15 are formed on the outer peripheral surfaces of the main roller 6 and the main roller 7 at a predetermined pitch (space) in the direction orthogonal to the travelling direction of the wire 15. The pitch of the grooves formed on the main roller 6 and the main roller 7 is appropriately set according to the number and the thickness of a workpiece to be obtained from the work W. For example, the pitch may be about 0.3 mm.

The wire 15 is wound around the main roller 6 and the main roller 7 with a tension being adjusted from a supply bobbin (not shown), and fed to a winding bobbin (not shown). The wire 15 is an unseparated single wire, and is supplied from the supply bobbin and fitted to the outer peripheral surfaces of the main roller 6 and the main roller 7, and is wound around the winding bobbin after spirally wound a multitude of times (about 2,000 times at maximum) following the grooves formed outside of the main roller 6 and the main roller 7. As a result, between the main roller 6 and the main roller 7, a group of wires arranged in parallel having spaces therebetween of the predetermined pitch in the axial direction of the main rollers 6 and 7 is formed. The wire 15 is an electric conductor whose principal component is iron, and the diameter thereof is, for example, about 0.12 mm.

The power supplying unit 3 includes a wire power supply element 8 electrically connected to the wire 15, a holding member 9 that holds the wire power supply element 8, and an energizing roller (not shown) in contact with the work W. As shown in FIG. 2, a pulse machining voltage supplied from a power supply device 20 is applied to between the wire power supply element 8 and the energizing roller.

The wire power supply element 8 supplies power to the traveling wire group by bringing its upwardly exposed surface into contact with the wire 15 travelling downward in the vertical direction. A position where the wire 15 and the work W are close to each other and where the electric discharge machining is performed is a portion of the wire 15 traveling upward in the vertical direction.

One wire power supply element 8 may be disposed for the wire group or may be disposed for each wire in each row constituting the wire group. In this manner, the number of feeding points to the wire 15 is not limited, and various aspects can be taken.

The power supply device 20 is provided, for example, with a power supply circuit 21 that generates a predetermined pulse voltage suitable for wire machining from a commercial power supply, and a machining voltage controlling unit 22 that controls the power supply circuit 21. The machining voltage controlling unit 22 controls each element included in the power supply circuit 21 to generate a pulse machining voltage suitable for electric discharge machining. As shown in FIG. 2, the pulse machining voltage generated by the power supply circuit 21 is applied to between the wire 15 and the work W via the wire power supply element 8 and the energizing roller (not shown) described above.

When a short-circuit state in which the wire 15 and the work W are in contact with each other is detected, the machining voltage controlling unit 22 of the power supply device 20 performs various controls according to an electric discharge state between the wire 15 and work W, such as temporarily suspending the application of the pulse voltage between the wire 15 and the work W.

One power supply circuit 21 included in the power supply device 20 may be disposed for each wire power supply element 8, or the power supply circuit 21 may be configured in such a way that a pulse voltage is supplied for a plurality of wire power supply elements 8 from one power supply circuit 21.

A machining fluid supply device 30 supplies the machining fluid to the machining reservoir 4 installed in a main unit of the wire electric discharge machining device 1. The machining fluid is used for cooling a part where the electric discharge phenomenon occurs in the machining unit 5 and for removing machining waste of the work W generated in this part. As the machining fluid, it is preferable to use a fluid having a high resistance value, and for example, pure water, electric discharge machining oil or the like is used. By interposing the machining fluid between the wire 15 and the work W, a good electric discharge can be generated between the wire 15 and the work W so as to grind the work W.

The temperature of the machining fluid supplied from the machining fluid supply device 30 to the machining reservoir 4 is adjusted to a desired temperature (for example, about 20° C.). Electric conductivity of the machining fluid is appropriately adjusted by ion exchange resin or the like so that the electric conductivity falls within a certain range (for example, 1 µS/cm to 250 µS/cm).

As shown in FIG. 2, the wire electric discharge machining device 1 includes an inter-electrode voltage measuring unit (voltage sensor) 40 that measures the inter-electrode voltage between the wire 15 and the work W, a servo controlling unit 51 that controls the work feeding unit 2 by using the inter-electrode voltage measured by the inter-electrode voltage measuring unit 40, and a machining controlling unit 52 that controls the machining unit 5.

The servo controlling unit 51 controls the interval (gap) between the machining surface of the work W and the wire 15 to an appropriate distance by controlling the servomotor (not shown) of the work feeding unit 2 based on the inter-electrode voltage measured by the inter-electrode voltage measuring unit 40, thereby achieving a stable electric discharge machining. The details of the servo controlling unit 51 will be described below.

The machining controlling unit 52 controls a travelling speed of the wire 15 by rotating the main rollers 6 and 7 in the same direction and at the same speed. The machining controlling unit 52 can adjust the travelling speed of the wire 15 to an arbitrary speed within a range of, for example, 100 m/min or more and 900 m/min or less.

The machining voltage controlling unit 22, the servo controlling unit 51, and the machining controlling unit 52 are provided, for example, with a CPU, an auxiliary storage device for storing a program and the like executed by the CPU, a main memory that functions as a work area when each program is executed, and the like. Examples of the auxiliary storage device include a magnetic disk, a magnetic optical disk, and a semiconductor memory.

Various programs (for example, a machining voltage control program, a servo control program, a machining control program, and the like) are stored in the auxiliary storage device, and the CPU reads these programs from the auxiliary storage device to the main memory and executes them to achieve various functions that will be described below. The machining voltage controlling unit 22, the servo controlling unit 51, and the machining controlling unit 52 may be achieved by a hardware configuration each having an individual CPU or the like, or they may be configured in such a way that functions of the respective controlling units are achieved by a common CPU. A location where the servo controlling unit 51 and the machining controlling unit 52 are installed is not limited, and they may be installed in the power supply device 20 or may be installed in the main unit of the wire electric discharge machining device 1, for example.

The machining voltage controlling unit 22, the servo controlling unit 51, and the machining controlling unit 52 may be configured to be connectable to an input device for a user to input a target voltage value, a target amplitude value and the like that will be described below, a display device for displaying various data, a communication device for communicating with an external device and the like, so that information can be mutually transferred.

Figure 3:
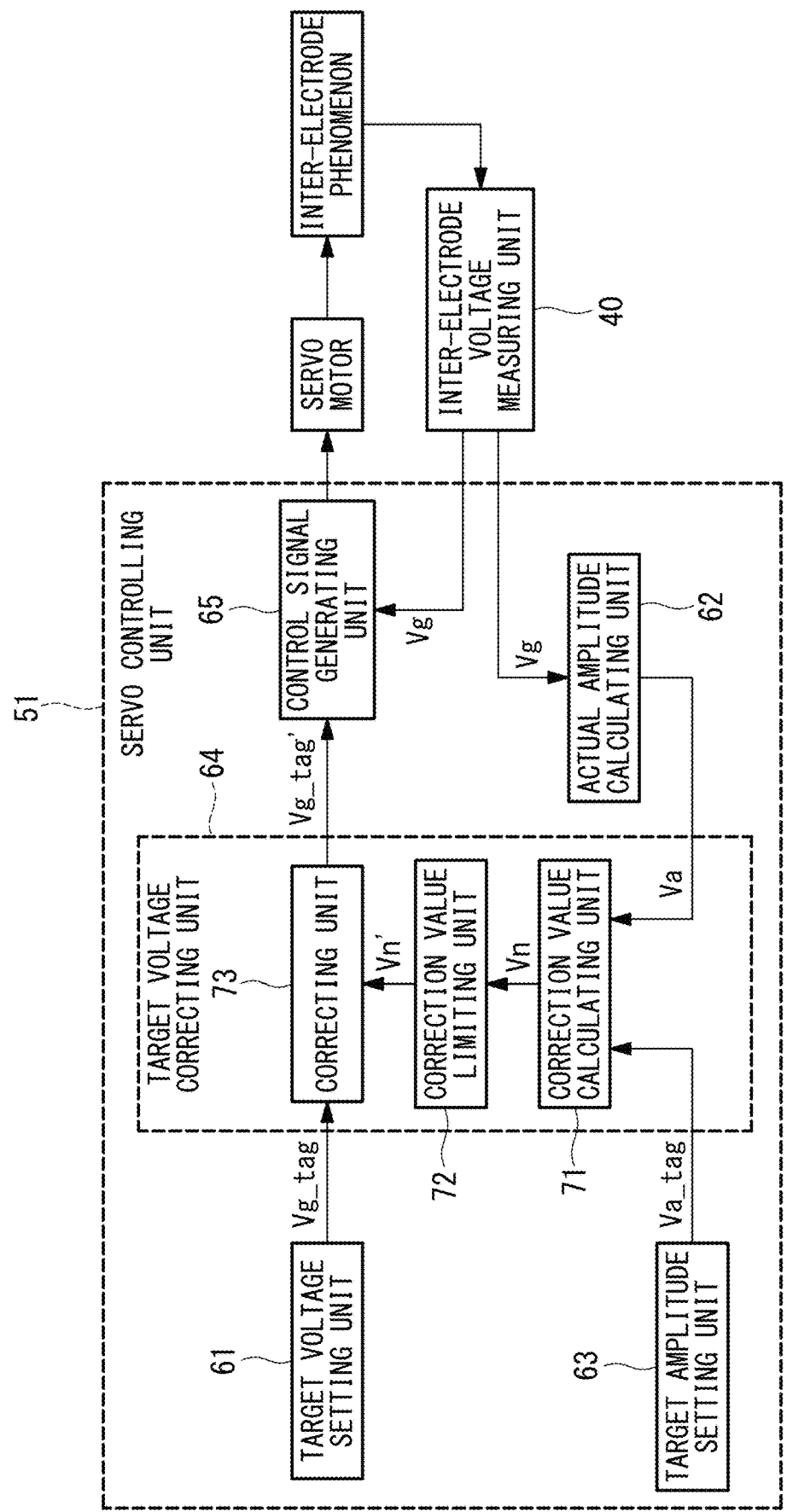
FIG. 3 is a functional block diagram showing functions included in a servo controlling unit according to an embodiment of the present invention in an expanded manner.
Figure 4:
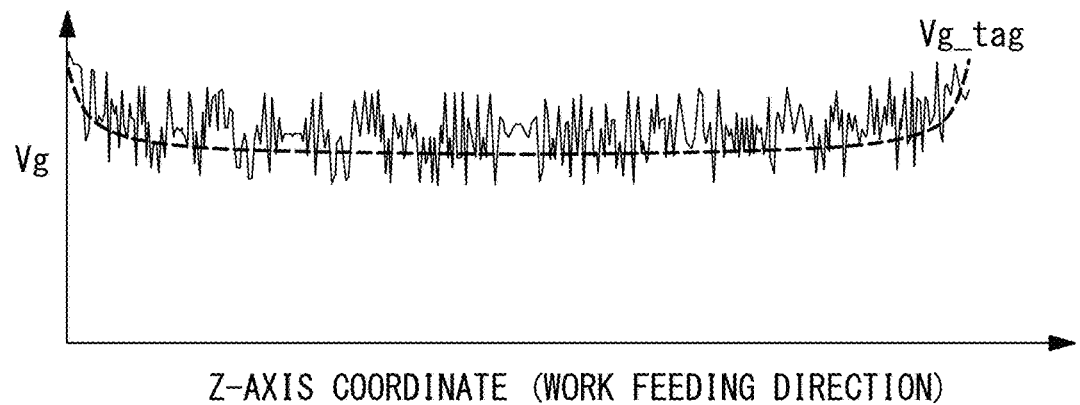
FIG. 4 is an explanatory diagram for conceptually explaining calculation contents of an actual amplitude calculating unit included in a servo controlling unit according to an embodiment of the present invention.

Next, the servo controlling unit 51 according to an embodiment of the present invention will be described in detail with reference to FIG. 3. FIG. 3 is a functional block diagram showing functions included in the servo controlling unit 51 according to the present embodiment in an expanded manner. FIGS. 4 to 11 are explanatory diagrams for assisting in understanding of arithmetic processing performed by each unit included in the servo controlling unit 51. The horizontal axis represents the coordinate position of the work W in the Z-axis direction (work feeding direction), and the vertical axis shows the voltage.

As shown in FIG. 3, the servo controlling unit 51 includes a target voltage setting unit 61, an actual amplitude calculating unit 62, a target amplitude setting unit 63, a target voltage correcting unit 64, and a control signal generating unit 65 as a main configuration.

The target voltage setting unit 61 has target voltage information prepared in advance in accordance with the shape of a final machined product to be formed from the work W, for example. This target voltage information is information in which the coordinate position of a machining position of the work W in the Z-axis direction (work feeding direction) and a target voltage value Vg_tag are associated with each other. The target voltage setting unit 61 acquires the target voltage value Vg_tag corresponding to the machining position (Z-axis coordinate position) of the work W from the target voltage information and sets the target voltage value Vg_tag. For example, an example of the target voltage value Vg_tag is indicated by a broken line in FIGS. 4 and 5.

The actual amplitude calculating unit 62 calculates an amplitude (fluctuation width) Va of the inter-electrode voltage based on the inter-electrode voltage Vg measured by the inter-electrode voltage measuring unit 40. For example, as shown by thin solid lines in FIGS. 4 and 5, the time-series inter-electrode voltage Vg measured by the inter-electrode voltage measuring unit 40 is input to the actual amplitude calculating unit 62.

The actual amplitude calculating unit 62 calculates the amplitude Va of the inter-electrode voltage from the inter-electrode voltage Vg (or the inter-electrode average voltage).

Figure 5:
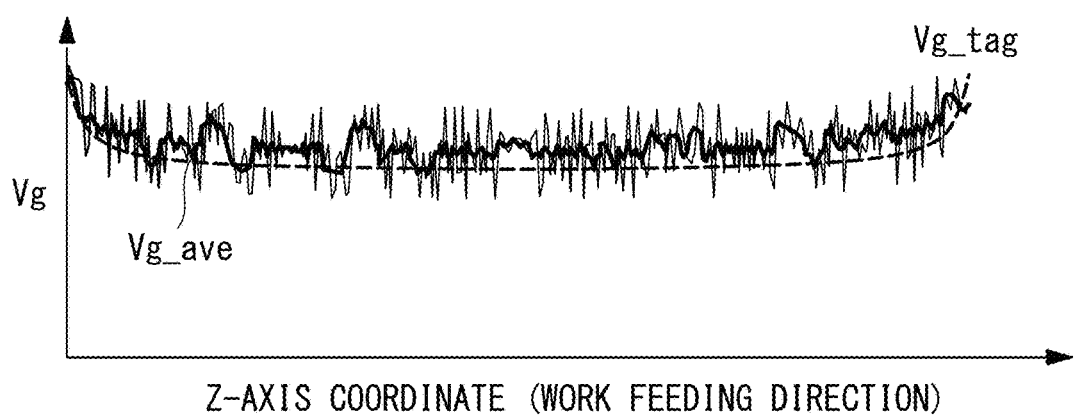
FIG. 5 is an explanatory diagram for conceptually explaining calculation contents of the actual amplitude calculating unit included in the servo controlling unit according to an embodiment of the present invention.
Figure 6:
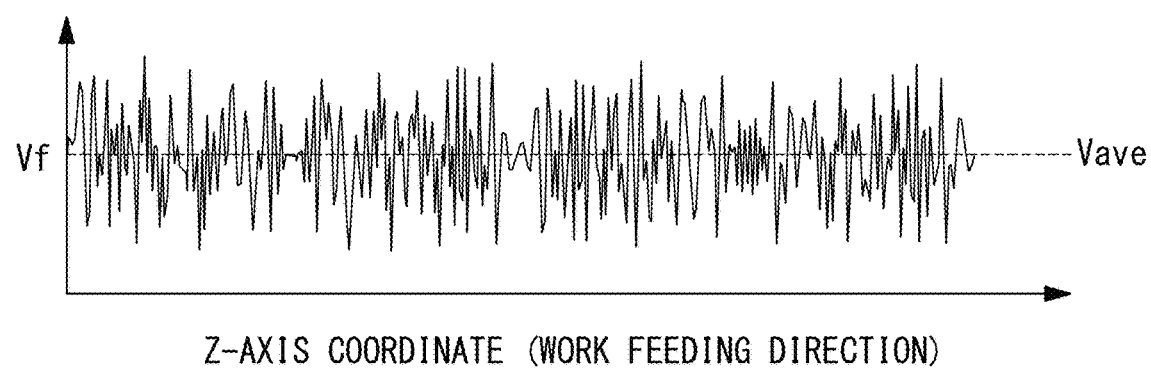
FIG. 6 is an explanatory diagram for conceptually explaining calculation contents of the actual amplitude calculating unit included in the servo controlling unit according to an embodiment of the present invention.
Figure 7:
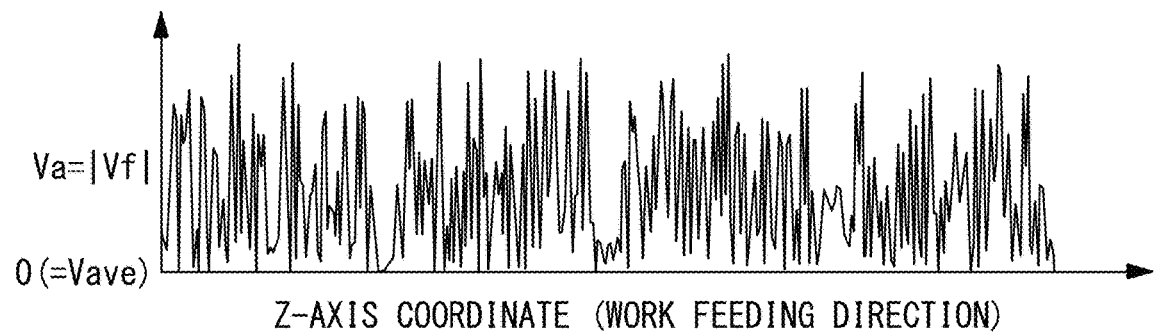
FIG. 7 is an explanatory diagram for conceptually explaining calculation contents of the actual amplitude calculating unit included in the servo controlling unit according to an embodiment of the present invention.

Specifically, as shown in FIG. 5, the actual amplitude calculating unit 62 first calculates an average voltage Vg_ave of the inter-electrode voltage Vg for each predetermined period. In FIG. 5, the average voltage Vg_ave is indicated by a bold solid line. Subsequently, the actual amplitude calculating unit 62 calculates a fluctuation range Vf (=Vg−Vg_ave) of the inter-electrode voltage Vg with reference to the average voltage Vg_ave by subtracting the average voltage Vg_ave from the inter-electrode voltage Vg in each predetermined period (See FIG. 6). As a result, the amplitude of the inter-electrode voltage Vg with reference to the average voltage Vg_ave is calculated. Subsequently, as shown in FIG. 7, the actual amplitude calculating unit 62 calculates an absolute value of the fluctuation width Vf as the amplitude Va (=|Vf|) of the inter-electrode voltage. The actual amplitude calculating unit 62 outputs the calculated amplitude Va of the inter-electrode voltage to the target voltage correcting unit 64.

The actual amplitude calculating unit 62 may calculate an absolute value of a value obtained by dividing a difference between the maximum value (Max) and the minimum value (Min) in one oscillation of the inter-electrode voltage Vg by 2 ((Max−Min)/2) as the amplitude Va of the inter-electrode voltage.

The target amplitude setting unit 63 holds a preset target amplitude value Va_tag, and sets the target amplitude value Va_tag. The method of determining the target amplitude value will be described below. The target amplitude value Va_tag is set to a value larger than zero.

Figure 8:
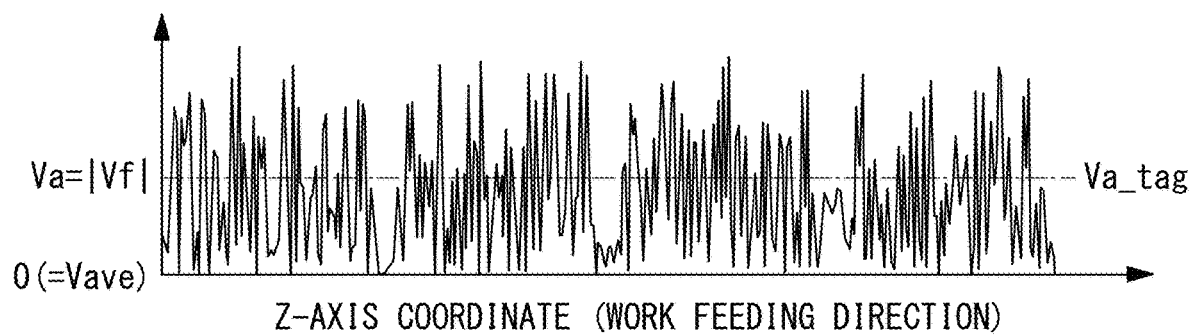
FIG. 8 is an explanatory diagram for conceptually explaining calculation contents of a correction value calculating unit included in the servo controlling unit according to an embodiment of the present invention.

The target voltage correcting unit 64 corrects the target voltage value Vg_tag in such a way that the amplitude Va calculated by the actual amplitude calculating unit 62 approaches the target amplitude value Va_tag that is set to a value larger than zero. Specifically, as shown in FIG. 8, the target voltage correcting unit 64 generates a target voltage correction value Vn for decreasing the target voltage value Vg_tag when the amplitude Va calculated by the actual amplitude calculating unit 62 is larger than the target amplitude value Va_tag, and generates the target voltage correction value Vn for correcting the target voltage value Vg_tag in the direction to increase the target voltage value Vg_tag when the amplitude Va is smaller than the target amplitude value Va_tag.

As another example, specifically, the target voltage correcting unit 64 may generate the target voltage correction value Vn for making the inter-electrode distance wider than before correction of the target voltage when the amplitude Va calculated by the actual amplitude calculating unit 62 is larger than the target amplitude value Va_tag. On the other hand, the target voltage correcting unit 64 may generate the target voltage correction value Vn for making the inter-electrode distance narrower than before correction of the target voltage when the amplitude Va is smaller than the target amplitude value Va_tag.

The target voltage correcting unit 64 is provided, for example, with a correction value calculating unit 71, a correction value limiting unit 72, and a correcting unit 73. The correction value calculating unit 71 calculates the target voltage correction value Vn by using the amplitude Va of the inter-electrode voltage calculated by the actual amplitude calculating unit 62 and the target amplitude value Va_tag. For example, the correction value calculating unit 71 has a correction value calculating expression that includes the amplitude Va of the inter-electrode voltage and the target amplitude value Va_tag as parameters, and calculates the target voltage correction value Vn by substituting the amplitude Va of the inter-electrode voltage calculated by the actual amplitude calculating unit 62 and the target amplitude value Va_tag into the correction value calculation expression. The correction value calculation expression is given by the following expression (1), for example.

$$Vn = -k*(Va - Va\_tag) \quad (1)$$

In the above expression (1), k is a coefficient and is a preset value.

Figure 9:
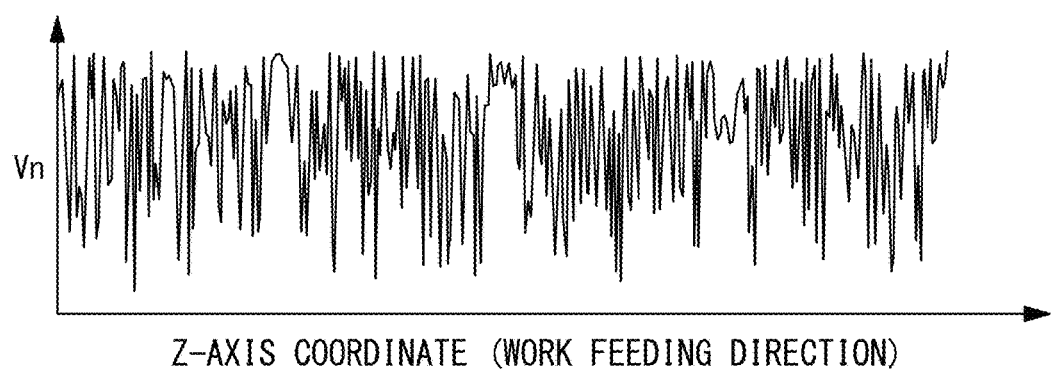
FIG. 9 is an explanatory diagram for conceptually explaining calculation contents of the correction value calculating unit included in the servo controlling unit according to an embodiment of the present invention.

By using the expression (1), the correction value calculating unit 71 obtains the target voltage correction value Vn as shown in FIG. 9, for example.

As another example, the target voltage correction value Vn may be obtained from the amplitude Va of the inter-electrode voltage calculated by the actual amplitude calculating unit 62 by using a calculation table showing the correlation between the amplitude Va of the inter-electrode voltage and the target voltage correction value Vn, the amplitude Va having been calculated in advance by using the correction value calculation expression.

Figure 10:
FIG. 10 is an explanatory diagram for conceptually explaining calculation contents of the correction value limiting unit included in the servo controlling unit according to an embodiment of the present invention.
Figure 11:
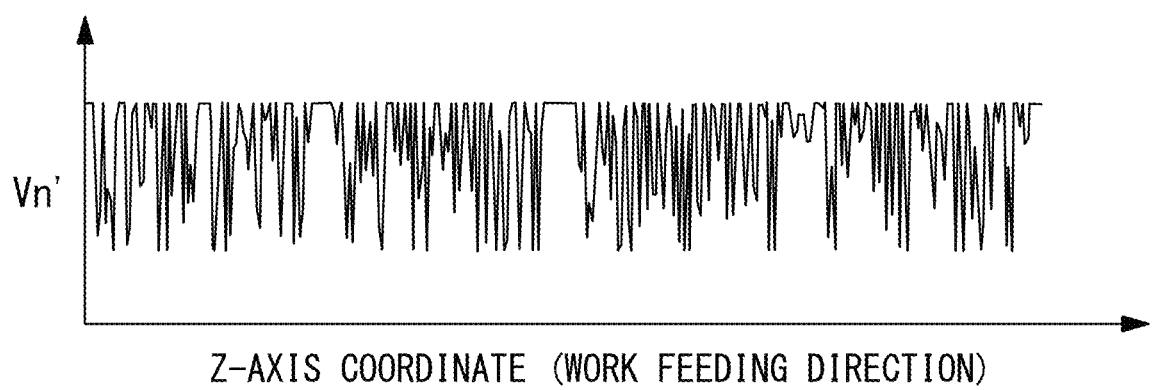
FIG. 11 is an explanatory diagram for conceptually explaining calculation contents of the correction value limiting unit included in the servo controlling unit according to an embodiment of the present invention.

The correction value limiting unit 72 limits the target voltage correction value Vn obtained by the correction value calculating unit 71 to within a preset upper and lower limit range. Specifically, as shown in FIG. 10, the correction value limiting unit 72 has an upper limit value Vn_max and a lower limit value Vn_mix of the correction value. When the target voltage correction value Vn is above the upper limit value Vn_max, the correction value limiting unit 72 sets the upper limit value Vn_max as the correction value thereof, and when the target voltage correction value Vn is lower than the lower limit value Vn_min, the correction value limiting unit 72 sets the lower limit value Vn_min as the correction value thereof. As a result, the target voltage correction value Vn' is obtained that falls within a range of the upper and lower limit values as shown in FIG. 11, for example.

The inter-electrode voltage measured by the inter-electrode voltage measuring unit 40 and the corrected target voltage value Vg_tag' are input to the control signal generating unit 65. The control signal generating unit 65 generates a control signal of the servomotor (not shown) of the work feeding unit 2 for causing the inter-electrode voltage Vg to approach the corrected target voltage value Vg_tag', and provides the control signal to the servomotor. As a result, the interval (gap) between the wire 15 and the work W is adjusted based on the corrected target voltage value Vg_tag'.

Next, a method of giving the target amplitude value Va_tag that is used in the target amplitude setting unit 63 will be described.

First, in the servo controlling unit 51 shown in FIG. 3, the target amplitude value Va_tag is set to zero, and electric discharge machining of the work W is performed to obtain the average value of the actual amplitude Va at this time. Then, an initial value of the target amplitude value Va_tag (for example, ½ of the average value of the actual amplitude Va) is set based on the average value of the actual amplitude Va. Then, by using the initial value of the target amplitude value Va_tag and the coefficient k set to a predetermined value, electric discharge machining of the work W is performed again to obtain the final machined product. Then, the target amplitude value Va_tag and the value of the coefficient k are converged by repeatedly performing tests while fine-tuning the target amplitude value Va_tag and the coefficient until final machined product of the quality desired by a manufacturer or the like is obtained in a stable manner. Then, when the final machined product having a quality desired by the manufacturer or the like is obtained in a stable manner, the target amplitude value Va_tag at that time is given to the target amplitude setting unit 63, and the coefficient k at that time is given to the correction value calculating unit 71.

The upper limit value and the lower limit value held by the correction value limiting unit 72 are set to, for example, about ±10% of the target voltage value Vg_tag. The upper and lower limit values may also be adjusted at the time of the preliminary test.

Figure 12:
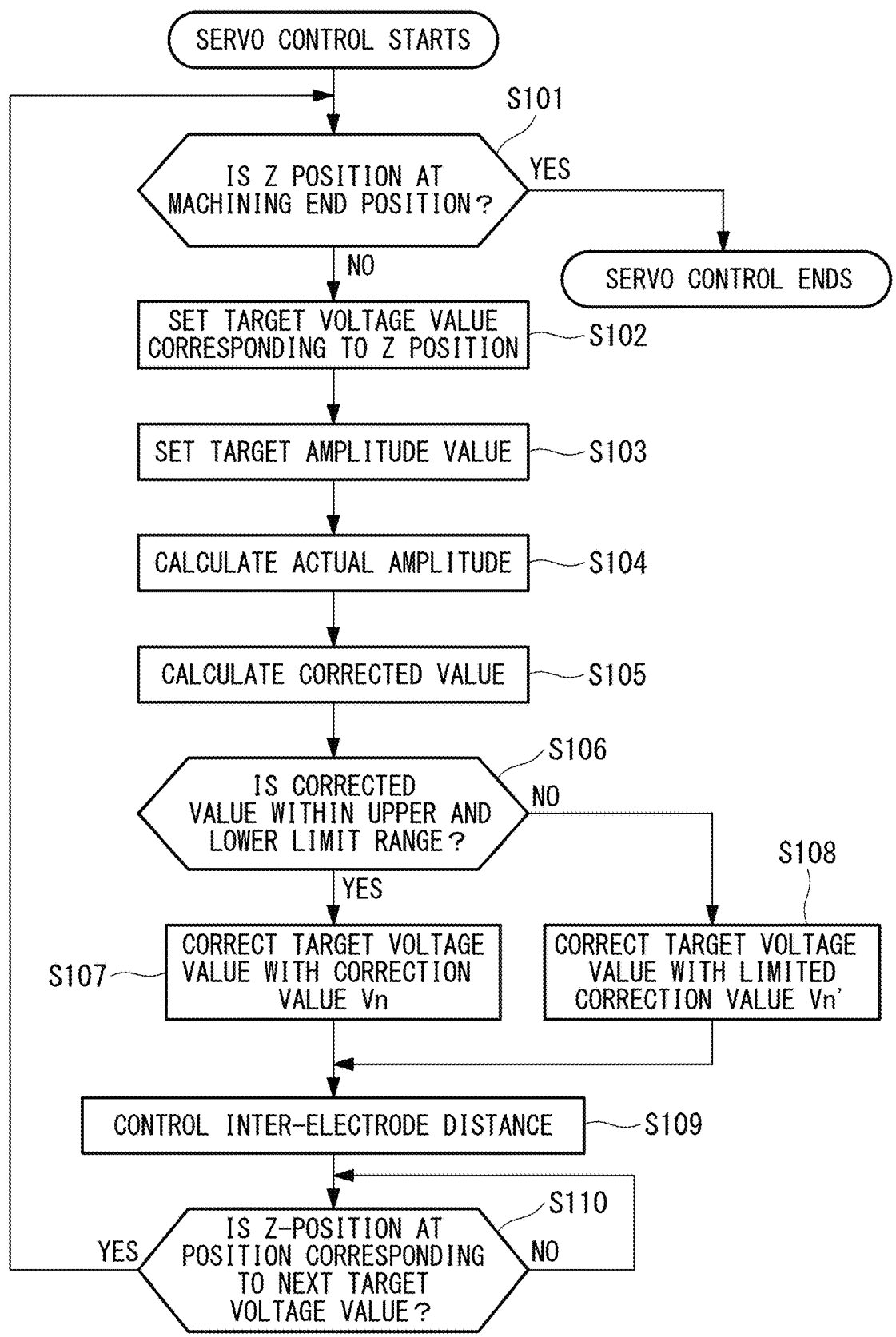
FIG. 12 is a flowchart showing processing procedures of servo control executed by the servo controlling unit according to an embodiment of the present invention.

Next, processing procedures of servo control by the servo controlling unit 51 described above will be described with reference to the drawing. FIG. 12 is a flowchart showing the processing procedures of the servo control according to an embodiment of the present invention.

First, when electric discharge machining of the work W is started, it is determined whether or not the machining surface of the work W has reached a machining end position in the Z-axis direction (work feeding direction) (S101). Then, if the machining surface of the work W has reached the machining end position (YES in S101), the servo control is ended. On the other hand, if it is determined that the machining surface of the work W has not reached the machining end position (NO in S101), the target voltage value Vg_tag corresponding to the position coordinate of the work W in the Z-axis direction is acquired from the target voltage information and the target voltage value Vg_tag is set (S102). As a result, the appropriate target voltage value Vg_tag linked with the machining position of the work W is set.

Subsequently, the target amplitude value Va_tag is set (S103), and furthermore, the amplitude Va of the inter-electrode voltage is calculated based on the inter-electrode voltage measured by the inter-electrode voltage measuring unit 40 (S104).

Subsequently, the target voltage correction value Vn is calculated by using the calculated amplitude Va of the inter-electrode voltage and the target amplitude value Va_tag (S105).

Subsequently, it is determined whether or not the target voltage correction value Vn is within a predetermined upper and lower limit range (S106). Then, if the target voltage correction value Vn is within the upper and lower limit range (YES in S106), the target voltage value Vg_tag is corrected by using the target voltage correction value Vn (S107). On the other hand, when the target voltage correction value Vn is out of the predetermined upper and lower limit range (NO in S106), the target voltage correction value Vn is corrected so as to fall within the upper and lower limit range, and then the target voltage value Vg_tag is corrected by using the corrected target voltage correction value Vn' (S108).

Subsequently, it is determined whether or not the Z coordinate position of the machining surface of the work W has reached a position corresponding to the next target voltage (S110). If the Z coordinate position has not reached the target position, the current servo control is maintained (NO in S110). On the other hand, if the machining surface of the work W has reached a position at which the next target voltage value is acquired (YES in S110), the process returns to step S101, and the subsequent processes described above are repeatedly performed.

As the above-described servo control is performed, while the interval (gap) between the work W and the wire 15 is controlled in such a way that the amplitude of the inter-electrode voltage Vg approaches the target amplitude value, the work feeding unit 2 causes the work W to move downward in a gradual manner, which makes the electric discharge machining to proceed. This enables a plurality of workpieces to be produced from the work W at the end.

As has been described above, according to the wire electric discharge machining device, the control method and the control program therefor according to an embodiment of the present invention, the inter-electrode voltage Vg between the wire 15 and the work W is measured by the inter-electrode voltage measuring unit 40, and the amplitude Va of the measured inter-electrode voltage is calculated by the actual amplitude calculating unit 62. Then, the target voltage value Vg_tag is corrected in such a way that the calculated amplitude Va approaches the target amplitude value Va_tag. In this regard, the target amplitude value Va_tag is set to a value larger than zero. This makes it possible to prevent the interval between the wire 15 and the work W from becoming narrower more than necessary as compared with the case in which the target amplitude is set to zero. Consequently, a short circuit between the wire 15 and the work W can be prevented, thereby making it possible to maintain a stable electric discharge. By setting the target amplitude to a value larger than zero, oscillation of the inter-electrode voltage can be allowed within the range of the target amplitude. As a result, should the wire 15 and the work W be short-circuited, the wire 15 can be separated again from the work W with physical oscillation of the wire 15 resulting from oscillation of the inter-electrode voltage.

Though the present invention has been described with reference to the embodiment as described above, the technical scope of the present invention is not limited to the scope described in the above embodiment. Various modifications or improvements can be added to the above-described embodiment within a scope not deviating from the gist of the invention, and a mode added with such modification or improvement is also included in the technical scope of the present invention. The above embodiments may be combined as appropriate.

The flow of the servo control described in the above embodiment is also an example, and unnecessary steps may be deleted, new steps may be added, or the processing order may be changed within a scope not deviating from the gist of the present invention.

The wire electric discharge machining device 1 according to the above embodiment may further include a switching unit that switches whether or not the target voltage is corrected by the target voltage correcting unit 64 on the basis of the composition of the work W. For example, when the work W contains silicon carbide or contains gallium nitride or the like, the composition may be non-uniform inside the work as compared with that of a uniform work W using silicon (Si) as a material. As a result, there is a possibility that the amplitude of the inter-electrode voltage measured by the inter-electrode voltage measuring unit 40 suddenly changes or the amplitude value increases. Therefore, when the work containing the silicon carbide as described is machined, fluctuation of the inter-electrode voltage can be reduced by correcting the target voltage based on the amplitude of the inter-electrode voltage, thereby making it possible to achieve a stable electric discharge machining. On the other hand, when a work W having a stable composition such as the Si, a high-quality final machined product can be obtained even if the servo control is performed without correcting the target voltage value. In such a case, for example, by disabling a function of the target voltage correcting unit 64 or by setting the target amplitude value set by the target amplitude setting unit 63 to zero, the interval between the wire 15 and the work W can be controlled in an appropriate manner without correcting the target voltage. As a means for switching, a structure like a switch that physically switches a circuit may be used, or a technique can be adopted in which a function is disabled in terms of software or the set value of the target amplitude value is switched to zero.

REFERENCE SIGNS LIST

1 Wire electric discharge machining device
2 Work feeding unit
3 Power supplying unit
4 Machining reservoir
5 Machining unit
6 Main roller
7 Main roller
8 Wire power supply element
15 Wire 20 Power supply device
21 Power supply circuit
22 Machining voltage controlling unit
40 Inter-electrode voltage measuring unit
51 Servo controlling unit
52 Machining controlling unit
61 Target voltage setting unit
62 Actual amplitude calculating unit
63 Target amplitude setting unit
64 Target voltage correcting unit
65 Control signal generating unit
71 Correction value calculating unit
72 Correction value limiting unit
73 Correcting unit

What is claimed is:

1. A wire electric discharge machining device comprising:
a wire,
a sensor configured to measure an inter-electrode voltage between the wire and a work; and
a controller configured to includes a processor, and a memory storing a program that, when executed by the processor, causes the processor to perform operations, the operations including:
setting a target voltage value in accordance with a shape of a final machined product to be formed from the work,
calculating an amplitude of the inter-electrode voltage measured by the sensor,
calculating a target voltage correction value for causing the amplitude of the inter-electrode voltage to approach a target amplitude that is set to a value larger than zero,
correcting the target voltage value by using the target voltage correction value, and
controlling an inter-electrode distance between the wire and the work so that the inter-electrode voltage measured by the sensor approaches the corrected target voltage value.

2. The wire electric discharge machining device according to claim 1, wherein the target voltage correction value is calculated to reduce the target voltage when the amplitude of the inter-electrode voltage is larger than the target amplitude, and the target voltage correction value is calculated to increase the target voltage when the amplitude is smaller than the target amplitude.

3. The wire electric discharge machining device according to claim 1, wherein the target voltage correction value is limited within a preset limit range.

4. The wire electric discharge machining device according to claim 1, wherein the operations further include switching whether or not the target voltage is corrected on the basis of a composition of the work.

5. The wire electric discharge machining device according to claim 4, wherein the target voltage value is corrected when the work contains silicon carbide.

6. A non-transitory computer readable storage medium storing a control program of the wire electric discharge machining device so as to control the wire electric discharge machining device according to claim 1.

7. A control method for a wire electric discharge machining device including a wire and a sensor measuring an inter-electrode voltage between the wire and a work, the control method comprising:
setting a target voltage value in accordance with a shape of a final machined product to be formed from the work,
calculating an amplitude of the inter-electrode voltage measured by the sensor,
calculating a target voltage correction value for causing the amplitude of the inter-electrode voltage to approach a target amplitude that is set to a value larger than zero,
correcting the target voltage value by using the target voltage correction value, and
controlling an inter-electrode distance between the wire and the work so that the inter-electrode voltage measured by the sensor approaches the corrected target voltage value.

* * * * *